US008060680B2

(12) United States Patent  
Lee et al.

(10) Patent No.: US 8,060,680 B2
(45) Date of Patent: Nov. 15, 2011

(54) METHOD OF ALLOCATING MEMORY (75) Inventors: Terry Ping-Chung Lee, Antelope, CA (US); James Lawrence Marsh, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1350 days.

(21) Appl. No.: 10/245,229

(22) Filed: Sep. 16, 2002

(65) Prior Publication Data

US 2004/0054839 A1   Mar. 18, 2004

(51) Int. Cl.
*G06F 13/36* (2006.01)
*G06F 3/00* (2006.01)
*G06F 13/00* (2006.01)
*G05D 11/00* (2006.01)

(52) U.S. Cl. .......... 710/306; 137/100; 710/52; 711/170; 711/173

(58) Field of Classification Search .................. 710/306, 710/52; 137/100; 711/170, 173
See application file for complete search history.

(56) References Cited

U.S. PATENT DOCUMENTS

| | | | | |
|---|---|---|---|---|
| 5,561,786 A * | 10/1996 | Morse | ........................... | 711/170 |
| 5,623,654 A * | 4/1997 | Peterman | ...................... | 707/206 |
| 5,625,819 A * | 4/1997 | Hoffer, Jr. | ...................... | 707/202 |
| 5,752,081 A | 5/1998 | Jirgal | | |
| 5,797,689 A * | 8/1998 | Oyama et al. | ................... | 400/74 |
| 5,845,296 A * | 12/1998 | Jasuja et al. | ................... | 707/205 |
| 5,860,142 A * | 1/1999 | Cepulis | ......................... | 711/202 |
| 5,930,827 A * | 7/1999 | Sturges | ......................... | 711/170 |
| 5,950,231 A * | 9/1999 | Nichol | ........................... | 711/170 |
| 6,006,289 A * | 12/1999 | James et al. | ..................... | 710/35 |
| 6,026,451 A * | 2/2000 | Sreenivas | ....................... | 710/39 |
| 6,301,631 B1 | 10/2001 | Chambers et al. | | |
| 6,311,242 B1 * | 10/2001 | Falkenburg et al. | .......... | 710/301 |
| 6,363,467 B1 * | 3/2002 | Weeks | .......................... | 711/170 |
| 6,374,340 B1 * | 4/2002 | Lanus et al. | ..................... | 711/173 |
| 6,421,756 B1 * | 7/2002 | Kelley et al. | .................. | 710/310 |
| 6,421,769 B1 * | 7/2002 | Teitenberg et al. | ........... | 711/170 |
| 6,425,024 B1 * | 7/2002 | Kelley et al. | .................... | 710/56 |
| 6,430,665 B1 * | 8/2002 | Allison et al. | ................. | 711/172 |
| 6,446,183 B1 * | 9/2002 | Challenger et al. | ........... | 711/170 |
| 6,618,783 B1 * | 9/2003 | Hammersley | ................. | 710/305 |
| 6,629,111 B1 * | 9/2003 | Stine et al. | ..................... | 707/205 |
| 6,643,754 B1 * | 11/2003 | Challenger et al. | ........... | 711/171 |
| 6,757,802 B2 * | 6/2004 | Trainin et al. | .................. | 711/170 |
| 6,801,963 B2 * | 10/2004 | Bissessur et al. | ............... | 710/33 |
| 6,801,970 B2 * | 10/2004 | Riley et al. | ..................... | 710/105 |

(Continued)

OTHER PUBLICATIONS

Jane Radatz, The IEEE Standard Dictionary of Electrical and Eletronics Terms, Sixth Edition, pp. 87-88.*

*Primary Examiner* — Mark Rinehart
*Assistant Examiner* — Christopher A Daley (57) ABSTRACT

A method of allocating memory in a memory unit includes creating a data structure containing a list of all available memory segments; and assigning a bias to each available memory segment. The bias indicates how to allocate that available memory segment in response to a resource request wherein the resource request is for a new entry in the memory unit that will be fragmented with at least two fragments of the new entry in the memory unit at being at different locations in the memory unit, the bias for an available memory segment comprising an indication of where within the new fragmented entry to be made in the memory unit a corresponding available memory segment should be used.

53 Claims, 8 Drawing Sheets

U.S. PATENT DOCUMENTS

| | | | |
|---|---|---|---|
| 6,804,761 B1 * | 10/2004 | Chen et al. | 711/170 |
| 6,820,183 B2 * | 11/2004 | Haggar et al. | 711/170 |
| 7,035,989 B1 * | 4/2006 | Hinker et al. | 711/171 |
| 7,035,990 B1 * | 4/2006 | Muhlbauer | 711/172 |
| 2003/0212873 A1 * | 11/2003 | Lee et al. | 711/170 |

* cited by examiner

METHOD OF ALLOCATING MEMORY

FIELD OF THE INVENTION

The present invention relates to the field of electronic devices, particularly computers. More specifically, the present invention relates to methods and systems for allocating memory resources of PCI devices, i.e., cards and bridges.

BACKGROUND OF THE INVENTION

Computers and their peripheral devices are used for a wide variety of purposes including, data storage, communication, and document creation. Peripheral Component Interconnect (PCI) is a local bus standard that is commonly used to connect a computer with one or more peripheral devices. A PCI bus provides a high-speed connection with peripherals and can connect multiple peripheral devices to the host computer. The PCI bus typically connects several PCI cards and PCI bridges to the PCI host-bridge of a computer. As used herein and in the appended claims, the term "host device" refers to any device that is connected to one or more peripheral devices, preferably using a PCI connection.

Figure 1:
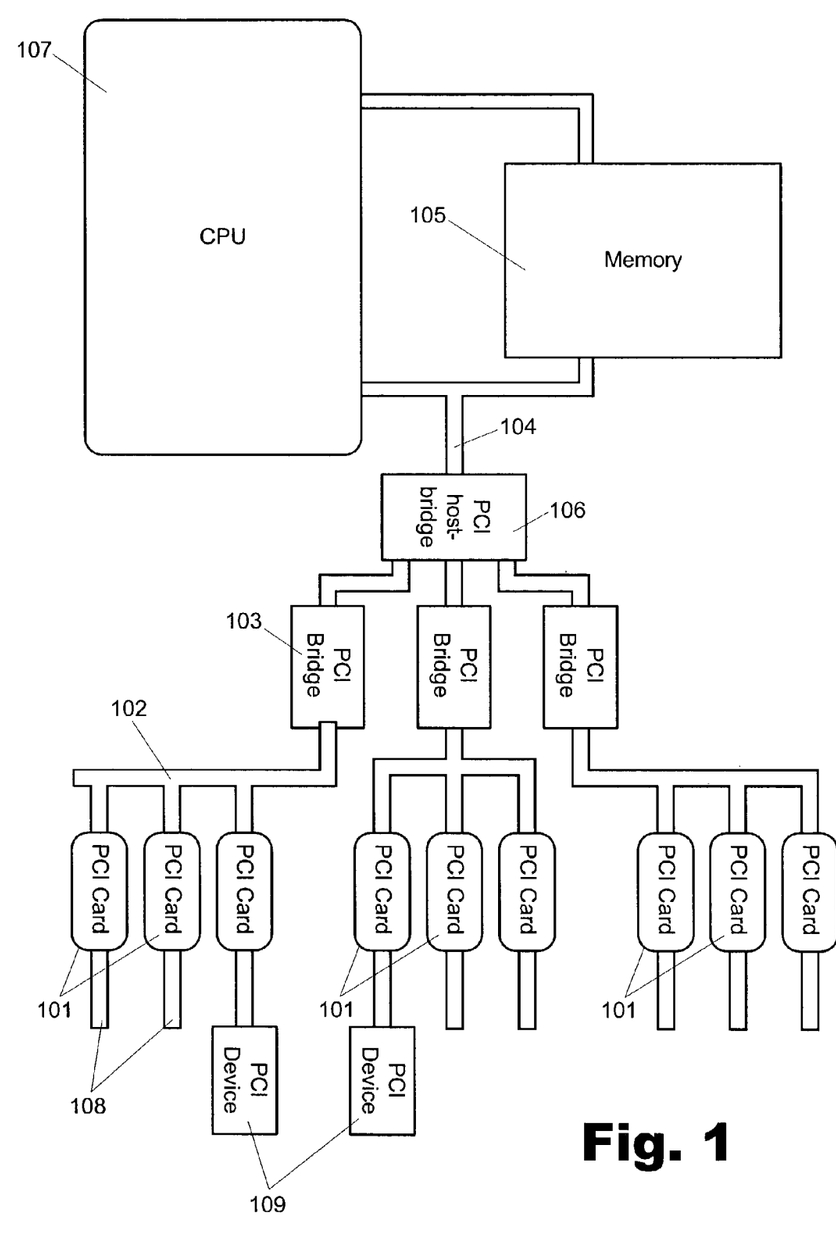
FIG. 1 is a block diagram of a configuration of main computer components and bus lines with which embodiments of the present invention may be practiced.

Peripheral devices that use the PCI standard are used in most computers systems. Some examples of PCI-compliant devices include: modems, hard drives, sound cards, graphics cards, controller cards, and scanners. As shown in FIG. 1, PCI cards (101) are connected to a PCI bus (102). The PCI bus (102) serves the function of connecting each PCI card (101) to the core computer components, i.e., the central processing unit (CPU) (107) and memory (105). By controlling a PCI-to-PCI bridge (103) and a PCI host-bridge (106), the PCI bus (102) is connected to the system bus (104), whereby access to the CPU (107) is achieved. Complete functionality of most any PCI device (109) requires the processing power of the CPU (107) and available memory on the PCI card itself (101). While some methods of interfacing PCI cards (101) to the core computer components may differ slightly, the result is the same. That desired result is the complete functionality of several PCI devices (109), connected to PCI cards (101) through a corresponding bus line (108), operating at the same time.

The sizeable improvements in the speed and processing power of computers have led to an increase in the number of peripheral devices needing support and computing resources. Traditionally, the program responsible for allocation of PCI card and PCI bridge memory resources to PCI devices is part of the computer firmware, i.e., software stored in a ROM (read-only memory) that usually only operates when a computer is first booted up.

For example, most computers have a BIOS (basic input/output system) program that operates whenever the computer is booted. The BIOS is responsible for loading the operating system, verifying power and important utilities of hardware, including peripheral devices, and performing tests on memory to confirm read/write functionality. When a firmware environment such as BIOS allocates memory to PCI devices and bridges, the available memory becomes fragmented and the size of the remaining free memory segments decreases.

In addition to the memory being divided into smaller and less useful sizes, the size of the data structure containing the start and end addresses of all available memory segments grows unpredictably. This data structure is used for tracking each available memory segment. Consequently, the allocation of memory to PCI devices may fail in two possible scenarios. First, the size of the data structure (usually stored in the PCI host-bridge of a computer) responsible for keeping track of available memory segments may grow to a point beyond its allotted memory space. Data structures stored in a ROM (read-only memory) device have a very limited size. Second, the fragmented memory segments of a PCI card or PCI bridge do not meet the alignment and size requirements of one or more PCI devices.

SUMMARY OF THE INVENTION

In one of many possible embodiments, the present invention provides, among other things, a method of allocating memory to Peripheral Component Interconnect (PCI) cards and bridges preferably includes creating a data structure containing a list of all available memory segments and assigning a bias to each available memory segment. The bias indicates how to allocate that available memory segment in response to a resource request.

BRIEF DESCRIPTION OF THE DRAWINGS

The accompanying drawings illustrate various embodiments of the present invention and are a part of the specification. Together with the following description, the drawings demonstrate and explain the principles of the present invention. The illustrated embodiments are examples of the present invention and do not limit the scope of the invention.

Throughout the drawings, identical reference numbers designate similar, but not necessarily identical, elements.

DETAILED DESCRIPTION OF THE PREFERRED EMBODIMENTS

There are many types of memory used in modern computers, including, random access memory (RAM), read only memory (ROM), cache, Dynamic RAM (DRAM), Static RAM (SRAM), Flash memory, virtual memory, and BIOS. While all memory is used for storing data, the speed, size, and applications of individual memory types can vary. In addition to the conventional system memory within a computer, internal devices such as PCI cards have a limited amount of memory on the device itself. It is this memory that the present invention allocates to PCI devices connected to or within the computer.

Memory resources typically become fragmented as parts of the memory are used. When data is stored in a portion of the memory resource, that used memory location may be located between, and separate, unused portions of the memory. Thus, the used and unused portions of the memory resource become fragmented. For example, when memory is allocated to each PCI device, memory fragmentation may occur leaving two smaller memory segments rather than one larger memory segment.

The present invention provides a method for allocating memory resources of PCI cards and PCI bridges to PCI-compliant devices (or "PCI devices"), while minimizing memory fragmentation. The available memory resources are preferably listed in a data structure that is stored in the PCI host-bridge of a computer, but could be stored in another memory resource. The PCI cards and bridges provide a resource request list to the CPU which is sorted by alignment and size requirements. An alignment requirement is a memory requirement in addition to the actual memory size needed by a PCI device. The alignment requirement specifies allowed flexibility in the memory allocation such that the memory addresses used by a PCI device can be accessed efficiently.

The present invention provides the necessary algorithms for preparing an available memory resources list and a resource request list. These two lists are consequently utilized to carry out memory resource allocation for the PCI cards and bridges. Embodiments of the present invention include software or firmware that, when executed, performs the task of allotting memory resources, e.g., RAM, so that the PCI cards and bridges connected to the system function as quickly as possible.

If embodied in firmware, an example of the present invention preferably includes an algorithm, i.e., a set of computer-readable instructions that is preferably stored in ROM and included as part of the hardware/firmware of the computer. Alternatively, the present invention could also be embodied as a program distributed on a storage device such as a floppy disc or an optical disc. In this embodiment, the present invention would also include additional programming responsible for reconfiguring the existing method of allocating memory to PCI cards and bridges that is already used by the computer.

Figure 2:
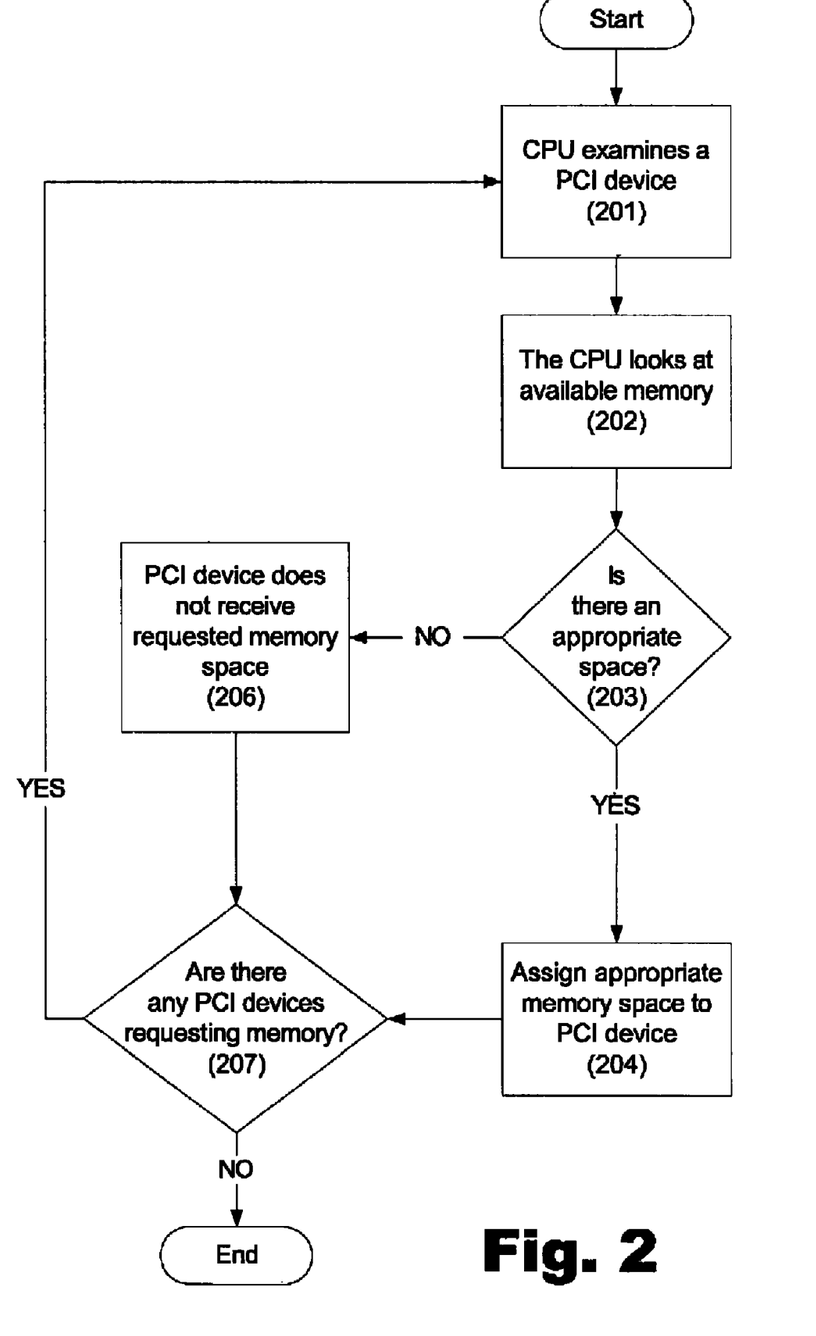
FIG. 2 is a flowchart illustrating the general algorithm used to allocate memory resources to PCI card and bridge requirements.

FIG. 2 is a flowchart illustrating the process of allocating memory to PCI devices according to accepted principles used in the art.

As shown in FIG. 2, the method begins when a PCI card (or bridge) is examined by the central processing unit (CPU) of the computer (step 201). This may occur when the computer is powering up after being turned on, or when a PCI device is turned on or connected to the computer. Usually, the operating system or computer hardware contains the necessary software to detect peripheral devices and control the allocation of memory and processing time to the device.

In all cases, the CPU examines the resource requests of the PCI cards and bridges. A peripheral device identification, alignment requirement, and memory size requirement are supplied to the CPU for each PCI-device. The CPU then analyzes the available memory (e.g., PCI card memory), or a list of the available memory resources, looking for a contiguous memory segment that fulfills the alignment and size requirement of the PCI device (step 202). The requested alignment and size requirement of the PCI device may or may not be available (determination 203).

If an available segment of memory meets the alignment and size requirement of the PCI device, the PCI device is assigned that available segment of memory (step 204). If there are no suitable available memory segments, i.e., no available memory segments fulfill the alignment and size requirements specified, the PCI device will not be provided with memory (step 206) and will not function without user intervention.

There are several options a user may choose to help provide sufficient memory to a PCI device that is not functioning as desired. For example, most operating systems enable users to configure which peripheral devices will receive memory allocation first, and how much memory will be provided. For most users, the details of configuring the memory of PCI cards and bridges are better left to the operating system or other software provided with the computer for that purpose. Another option to provide more available memory to a preferred PCI device may be plugging in that preferred device and unplugging another conflicting device that is not as needed.

The software provided by the computer will continue to allocate memory to additional PCI devices (determination 207) until all PCI devices have been allotted a suitable memory segment in a corresponding PCI card or bridge, or there is not enough memory to fulfill anymore resource requests of the PCI devices, or the data structure containing the list of all available memory segments grows to a size beyond the existing bounds.

Figure 3:
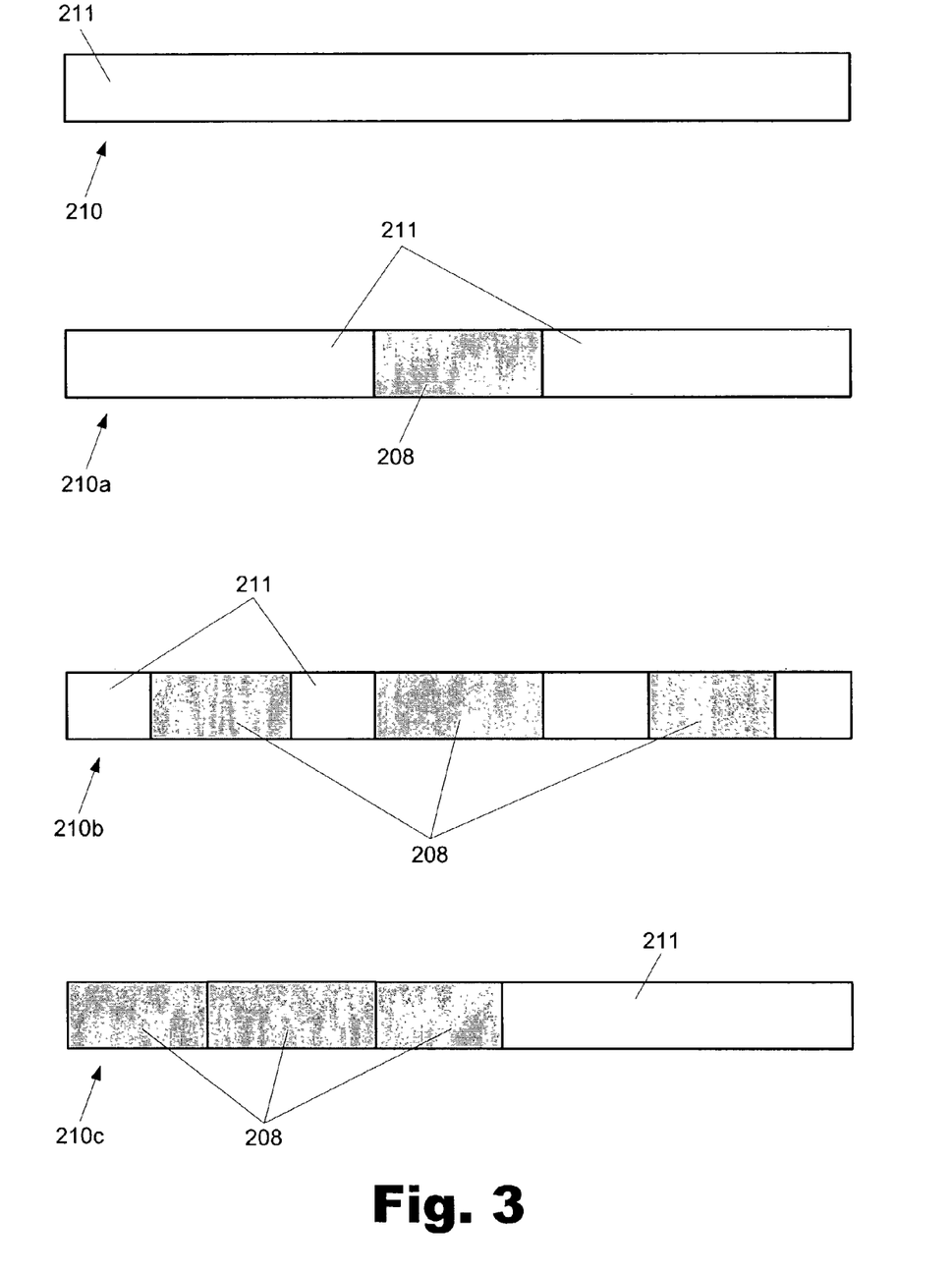
FIG. 3 is a block diagram illustrating examples of memory fragmentation and a solution of the memory fragmentation.

FIG. 3 is a block diagram illustrating the effects of memory fragmentation. As shown in FIG. 3, a memory resource (210) is initially entirely unused. Unused portions of the memory resource are indicated by reference numeral (211). Used portions of the memory resource are indicated by shading and reference numeral (208). During memory fragmentation a large space of available memory (211) is divided when a process or PCI device requests memory space of a PCI card or bridge. When the memory consumed (208) by the process or PCI device does not follow any other regulation other than the alignment and size requirement, the CPU assigns the first available segment found, e.g., the segment (208) in memory resource (210a).

As memory fragmentation progresses, the sizes of the available memory segments (211) in the memory resource (210b) may be much smaller than the total amount of available memory. If the memory fragmentation progresses to the point where no available memory segments (211) are large enough to meet the size and alignment requirements of the requesting processes and PCI devices, the processes must wait until larger segments of memory become available. If, however, as under the principles of the present invention, the available memory segments (211) were to be consumed by careful selection criteria, the available segments of contiguous memory (211) would be larger and could more easily fill additional resource requests. This situation is illustrated, for example, in memory resource (210c). In memory resource (210c), the used portions (208) of the memory are carefully collected, e.g., contiguously, to preserve as much contiguous unused memory (211) as possible.

Another negative aspect of memory fragmentation is that memory fragmentation causes the size of the data structure needed to store information about each contiguous memory segment to grow. The more fragmented the memory resource is, the more data it will require to describe that fragmentation, i.e., which segments are used and which unused. In some instances, a set of pathological resource requests may cause the data structure to grow to a size beyond its set boundary.

In one embodiment, the present invention provides a solution to the problems caused by memory fragmentation by assigning a bias to the available memory segments. This bias determines the starting point and direction in which the available memory segment will be consumed.

Figure 4:
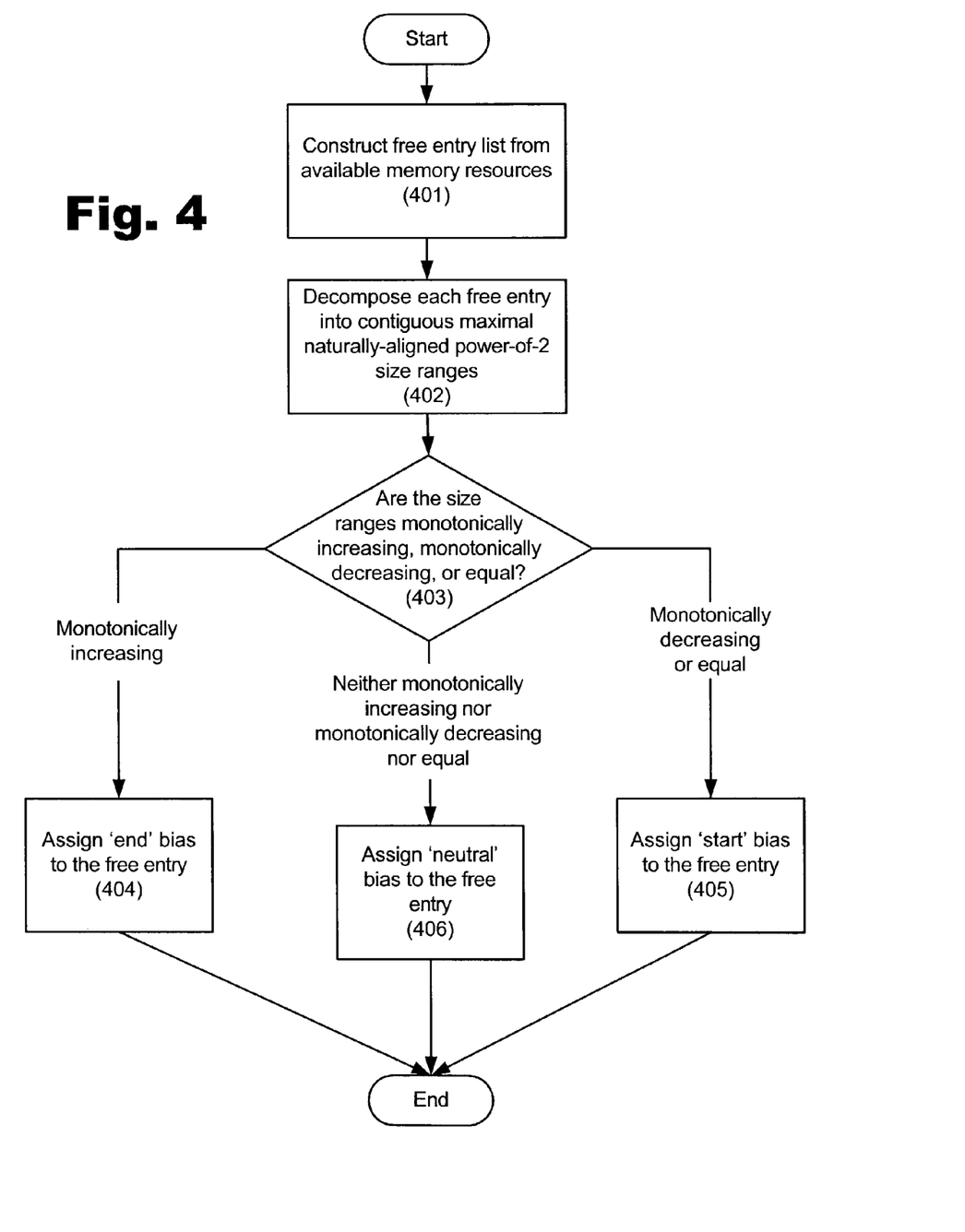
FIG. 4 is a flowchart illustrating a method of assigning a bias to available memory segments according to an embodiment of the present invention.

FIG. 4 is flow chart illustrating a method of assigning a bias to an available memory segment according to principles of the present invention. This flowchart also serves as an outline and disclosure of an algorithm that may be used by one of skill in the art to implement such an algorithm in software and firmware embodiments of the present invention.

As shown in FIG. 4, the method begins when a data structure is created in memory (step 401). This memory structure contains the starting address and ending address of every contiguous memory segment available. The data structure also contains the bias of every contiguous memory segment available. The bias of a segment is a determination of whether that segment should be used at the beginning of a new entry or allocation of the memory unit (start bias), the end of a new entry to the memory unit (end bias), or can be used at any position within a new entry to the memory unit (neutral bias).

The starting and ending addresses of each memory segment are typically a 32-bit word identifying a specific location in a memory array. For purposes of calculation and recording, it is common to document these addresses in hexadecimal notation, e.g., a location in memory given by the decimal number 348796328, is 14CA35A8 in hexadecimal notation, and 10100110010100011010110101000 in binary notation.

In order to determine the bias of each individual memory segment, decomposition must be performed. Decomposition is the analyzing of the memory segment as a collection of smaller possible segments. While there may be several ways of dividing the individual memory segments, the algorithm of the present invention uses contiguous maximal naturally-aligned power-of-2 size ranges (step 402).

Decomposition of a memory segment into contiguous maximal naturally-aligned power-of-2 size ranges comprises analyzing the starting address of the memory segment and determining the largest integer number, also being a power-of-2, i.e., $2^x$, by which the starting address can be evenly divided. This integer is referred to as a size range. After the first size range is found, the first size range is added to the starting address. The address determined by adding the first size range to the starting address is now used to determine the next maximal power-of-2 size range. This process continues until the ending address is reached.

If the sizes of the maximal power-of-2 size ranges representing the available memory segment are monotonically increasing (determination 403), the algorithm assigns an end bias to that available memory segment (step 404). If the sizes of the maximal power-of-2 size ranges representing the available memory segment are equal or monotonically decreasing (determination 403), the algorithm assigns a start bias to that memory segment (step 405). If the sizes of the maximal power-of-2 size ranges representing the available memory segment are neither monotonically increasing, nor monotonically decreasing, nor equal (determination 403), the algorithm assigns a neutral bias to that memory segment (step 406).

Figure 5:
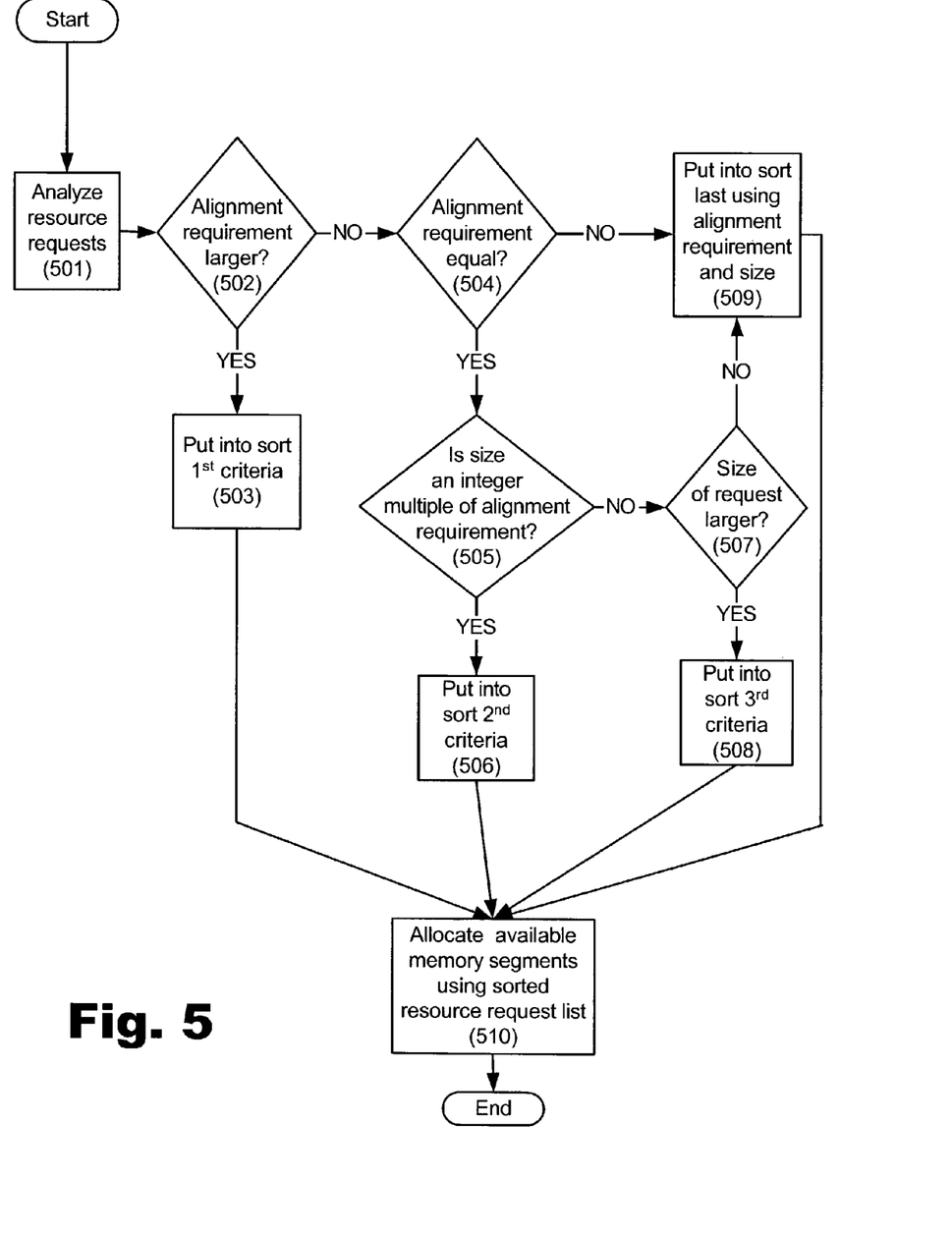
FIG. 5 is a flowchart illustrating a method of sorting the resource requests of a set of PCI cards and bridges according to an embodiment of the present invention.

In addition to biasing the available memory segments, i.e., designating at what location and in which direction the available memory segments will be filled, the algorithms of the present invention also preferably sort the resource requests to enable more efficient memory allocation. FIG. 5 is a flow chart illustrating a method of sorting the resource requests of a set of PCI cards and bridges according to an embodiment of the present invention. This flow chart also serves as an outline and disclosure of a sorting algorithm according to principles of the present invention and may be used by one skilled in the art to implement such a sorting method or algorithm in a software or firmware embodiment of the present invention.

As shown in FIG. 5, the method begins when a set of resource requests is analyzed (step 501). During the process of sorting the set of resource requests, a series of determinations is used to prioritize the resource requests, i.e., those with higher priority receive memory allocations first.

The first criterion used to sort the set of resource requests is the size of the alignment requirement. If the alignment requirement size of a first resource request is larger than the alignment requirement size of a second resource request (determination 502), the first resource request will be placed higher, or given a higher priority, in the resource request list (step 503).

If the size of the alignment requirement is equal for two or more resource requests (determination 504), the present invention sorts the two resource requests according to the following method. A resource request having a size being an integer multiple of the alignment requirement (determination 505) is placed higher in priority within the resource request list (step 506).

If the size of the alignment requirement is equal for two or more resource requests (determination 504) and the requested size is not an integer multiple of the alignment requirement for any of the two or more resource requests (determination 505), then the resource request with larger size (determination 507) will be placed higher in priority within the resource request list (step 508).

After the resource request list has been sorted according to the above-described method, memory is allocated to each resource request according to the order or priority of the requests in the request list (step 510). By allocating memory resources to larger resource requests first, the present invention provides a means of decreasing the negative effects of memory fragmentation. Although memory fragmentation may still occur, the largest resource requests will be provided sufficient memory leaving smaller resource requests with the smaller segments of fragmented memory.

Figure 6:
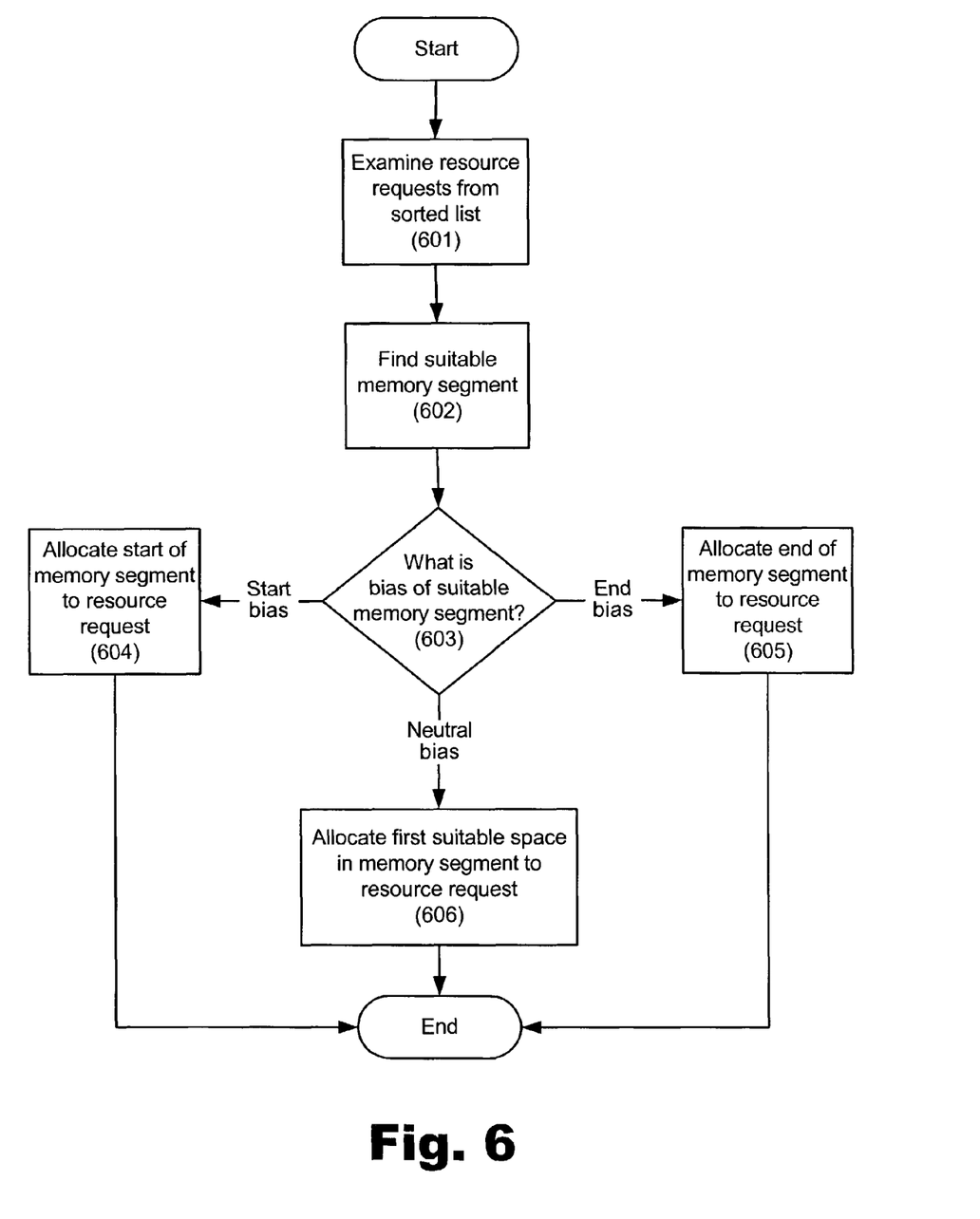
FIG. 6 is a flowchart illustrating a method of allocating memory to PCI cards and bridges according to an embodiment of the present invention.

FIG. 6 is a flow chart illustrating a method of allocating memory of PCI cards and bridges according to an embodiment of the present invention. This flow chart also serves as an outline and disclosure of a memory allocation method according to principles of the present invention and may be used by one skilled in the art to implement such a memory allocation method in firmware or software embodiment of the present invention.

As shown in FIG. 6, the method begins when a computer examines the resource requests of a PCI card or bridge (step 601). Using the free memory list as previously explained, the allocation software or firmware running on the computer searches for a suitable memory segment (step 602), i.e., a memory segment which fulfills the alignment and size requirements of the resource request.

If a suitable memory segment is available, the present invention uses the bias of the suitable memory segment (determination 603) to determine which area of the suitable memory segment to consume.

For example, if the bias of the suitable memory segment is start (determination 603), the resource request would consume that suitable memory segment from the starting address going forward (step 604). An end bias (determination 603) would likewise cause the resource request to consume the suitable memory segment from the end address going backwards (step 605).

When the bias of the suitable memory segment is neutral (determination 603), the present invention scans that suitable memory segment until an address space that meets the required alignment and size is found. The address space of that suitable memory segment is then consumed (step 606).

Figure 7A:
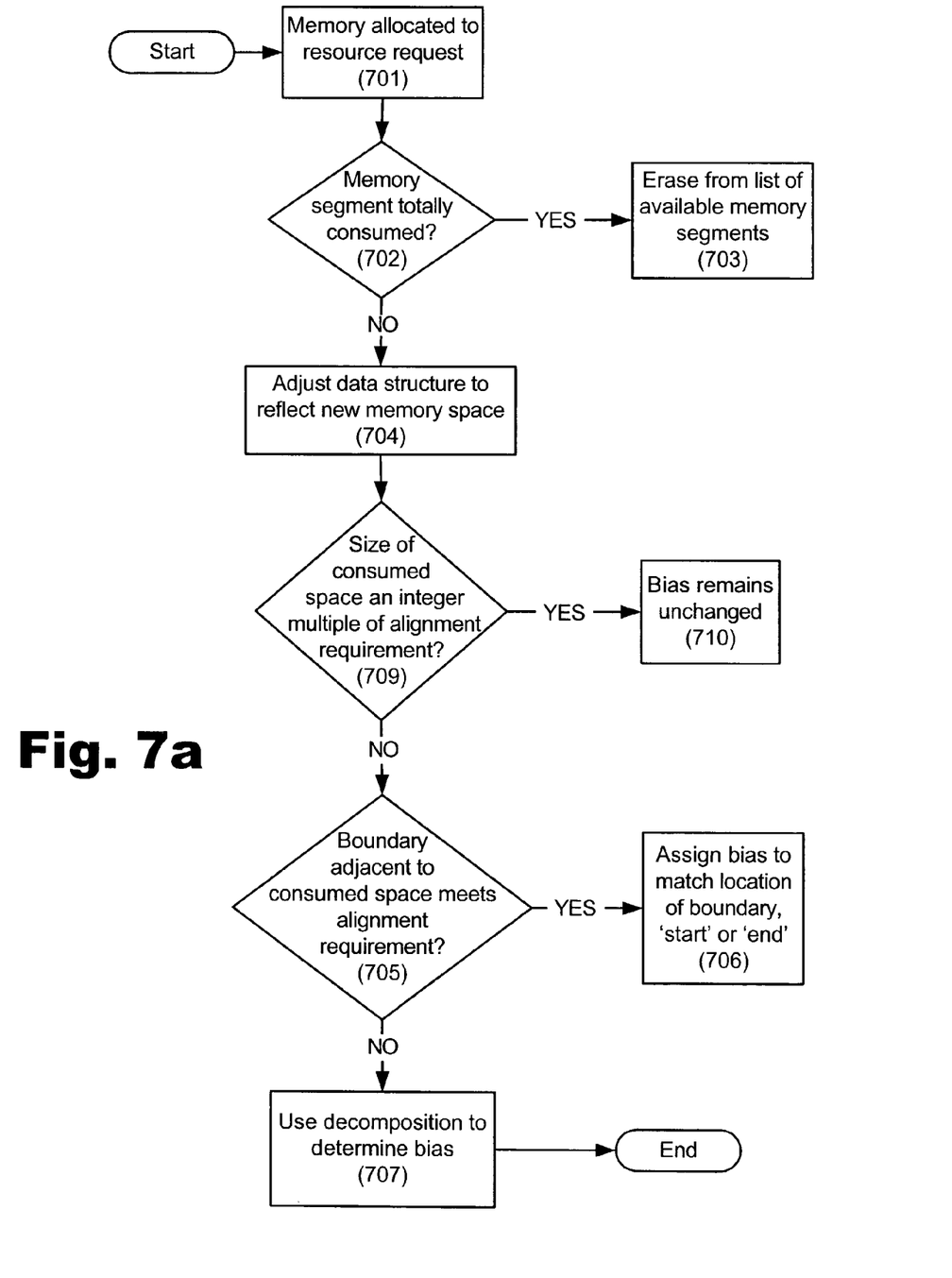
FIG. 7a is a flowchart illustrating a method of reassigning a bias to available memory segments according to an embodiment of the present invention.

FIG. 7a is a flow chart illustrating a method of reassigning a bias to a 'start' or 'end' biased memory segment that has been partially consumed. This flow chart also serves as an outline and disclosure of a reassigning bias method or algorithm according to the present invention and may be used by one skilled in the art to implement such a reassigning bias method in software or firmware according to an embodiment of the present invention.

As shown in FIG. 7a, the method begins when a suitable memory segment is allocated to a resource request (step 701). If the memory segment is totally consumed (determination 702), the corresponding entry of the data structure, i.e., the memory structure containing the start address, end address, and bias of all available memory segments, is erased (step 703).

If the memory segment is not totally consumed (determination 702), the data structure is updated to reflect the start and end address of the new available memory segment(s) (step 704). If the recently allocated resource request had a size being an integer multiple of the alignment requirement (determination 709), the bias of the new memory segment remains unchanged (step 710). If the recently allocated resource request had a size not being an integer multiple of the alignment requirement (determination 709), the boundary of the new memory segment adjacent to the consumed space is evaluated. If the boundary adjacent to the consumed space meets the alignment requirement of the consumed space (determination 705), the bias assigned to the new memory segment is 'start' if the boundary is at the starting address of the new memory segment, i.e., the starting address of the new memory segment is an integer multiple of the alignment requirement of the consumed space, and 'end' if the boundary is at the end address of the new memory segment (step 706).

If the size of the consumed space is not an integer multiple of the alignment requirement of the consumed space (determination 709), and the boundary of the new memory segment adjacent to the consumed space does not meet the alignment requirement of the consumed space (determination 705), the bias of the new memory segment is determined by decomposition (step 707), i.e., the new memory segment is divided into maximal naturally-aligned power-of-2 size ranges and evaluated as previously explained in connection with FIG. 4.

Figure 7B:
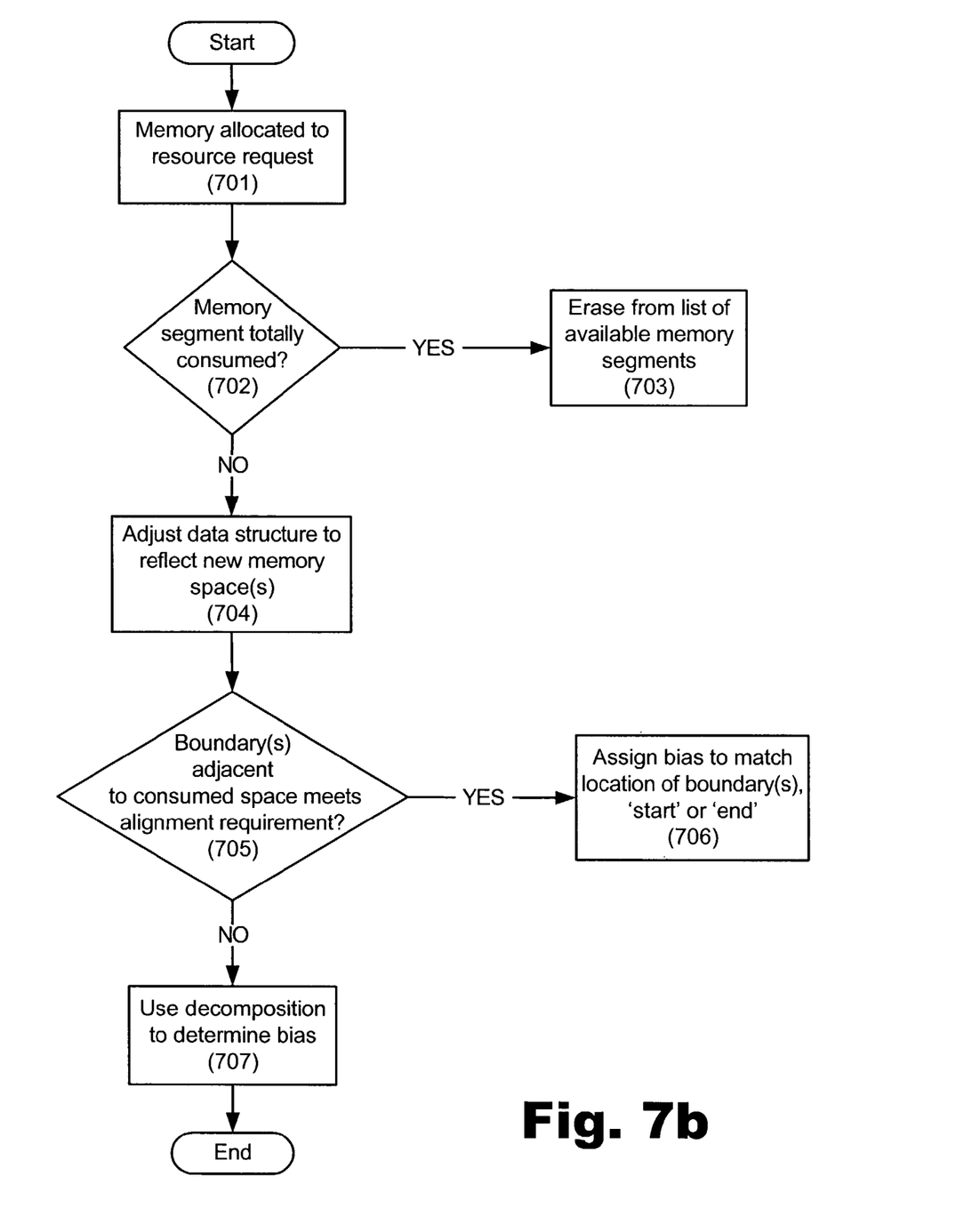
FIG. 7b is a flowchart illustrating another method of reassigning a bias to available memory segments according to an embodiment of the present invention.

FIG. 7b is a flow chart illustrating a method of reassigning a bias to a neutral biased memory segment that has been partially consumed. This flow chart also serves as an outline and disclosure of a reassigning bias method or algorithm according to the present invention and may be used by one skilled in the art to implement such a reassigning bias method or algorithm in software of firmware according to an embodiment of the present invention.

As shown in FIG. 7b, the method begins when a suitable memory segment is allocated to a resource request (step 701). If the memory segment is totally consumed (determination 702), the corresponding entry in the data structure, i.e., the memory structure containing the start address, end address, and bias of all available memory, is erased (step 703).

If the memory segment is not totally consumed (determination 702), the data structure is updated to reflect the start and end address of the new available memory segment or segments (step 704). The method used to assign a bias for the new available memory segment or segments is the same as the method described in connection with FIG. 7a, omitting (determination 709) and (step 710).

The preceding description has been presented only to illustrate and describe the invention. It is not intended to be exhaustive or to limit the invention to any precise form disclosed. Many modifications and variations are possible in light of the above teaching.

The preferred embodiment was chosen and described in order to best illustrate the principles of the invention and its practical application. The preceding description is intended to enable others skilled in the art to best utilize the invention in various embodiments and with various modifications as are suited to the particular use contemplated. It is intended that the scope of the invention be defined by the following claims.

What is claimed is:

1. A method of allocating memory in a memory unit, said method comprising:
creating a data structure containing a list of all available memory segments; and
assigning a bias to each available memory segment, said bias indicating how to allocate that available memory segment in response to a resource request wherein the resource request is for a new entry in said memory unit that will be fragmented with at least two fragments of said new entry in said memory unit at being at different locations in said memory unit, said bias for an available memory segment comprising an indication of where within the new fragmented entry to be made in the memory unit a corresponding available memory segment should be used.

2. The method of claim 1, further comprising:
receiving a resource request from a PCI card or bridge;
allocating an available memory segment in response to said resource request, said allocating being performed in accordance with the bias of said available memory segment; and
updating said list of all available memory segments.

3. The method of claim 2, wherein said updating the list of all available memory segments comprises erasing an entry from the data structure if an entire corresponding memory segment is consumed.

4. The method of claim 2, wherein said updating the list of all available memory segments further comprises editing entries in the data structure corresponding to partially consumed memory segments and adding new entries to the data structure when necessary.

5. The method of claim 2, further comprising updating a bias of a partially consumed memory segment after allocation in response to a resource request.

6. The method of claim 2, further comprising prioritizing resource requests of the PCI cards and bridges.

7. The method of claim 6, wherein said prioritizing comprises prioritizing said resource requests in accordance with a size of each request.

8. The method of claim 7, wherein said prioritizing further comprises prioritizing said resource requests in accordance with a size of an alignment requirement of each request.

9. The method of claim 1, further comprising assigning a start, end, or neutral bias to each available memory segment and storing each bias assignment in said data structure.

10. The method of claim 9, wherein assigning the corresponding bias comprises assigning a start bias if a contiguous maximal naturally-aligned power-of-2 size ranges of a remaining memory segment are equal or monotonically decreasing.

11. The method of claim 9, wherein assigning the corresponding bias further comprises assigning an end bias if a contiguous maximal naturally-aligned power-of-2 size ranges of a remaining memory segment are monotonically increasing.

12. The method of claim 9, wherein assigning the corresponding bias further comprises assigning a neutral bias if a contiguous maximal naturally-aligned power-of-2 size ranges of a remaining memory segment are neither monotonically increasing nor monotonically decreasing nor equal.

13. The method of claim 1, wherein said assigning a bias comprises decomposing each memory segment into size ranges.

14. The method of claim 1, wherein said decomposing each memory segment comprises dividing said memory segment into contiguous maximal naturally-aligned power-of-2 size ranges.

15. The method of claim 1, wherein said basis dictates where in a new memory entry the corresponding available memory segment is to be located.

16. A method of allocating memory, said method comprising:
   creating a data structure containing a list of all available memory segments within said memory;
   prioritizing resource requests for use of said memory;
   matching said resource requests to available memory segments from said list; and
   updating said list of all available memory segments;
   wherein said prioritizing the resource requests comprises prioritizing said resource requests in accordance with a size of an alignment requirement of each request; and
   wherein said prioritizing the resource requests further comprises sorting resource requests with equal alignment requirements by giving higher priority to a resource request with a size being an integer multiple of an alignment requirement of that resource request.

17. The method of claim 16, wherein said creating a data structure comprises organizing, in memory, information about each said available memory segment.

18. The method of claim 17, wherein said organizing information about each said available memory segment comprises storing a starting address and ending address of each available memory segment.

19. The method of claim 16, further comprising assigning a start, end, or neutral bias to each available memory segment and storing each bias assignment in said data structure.

20. The method of claim 19, wherein said assigning a start, end, or neutral bias comprises decomposing of each memory segment into size ranges.

21. The method of claim 10, wherein said decomposing each memory segment comprises dividing said memory segment into contiguous maximal naturally-aligned power-of-2 size ranges.

22. The method of claim 16, wherein said prioritizing the resource requests further comprises, where said resource requests have equal alignment requirements, and sizes that are not a multiple of the respective alignment requirement, prioritizing said resource requests by assigning a higher priority to a larger resource request.

23. The method of claim 16, wherein said matching of resource requests to available memory segments comprises taking a first resource request in a prioritized resource request list and consuming a first suitable memory segment found matching said first resource request.

24. The method of claim 23, wherein said consuming the first suitable memory segment comprises consumption of memory segments beginning at a certain address, depending on a bias of said first suitable memory segment.

25. The method of claim 16, wherein said updating the list of all available memory segments comprises erasing an entry from the data structure if an entire corresponding memory segment is consumed.

26. The method of claim 16, wherein said updating the list of all available memory segments further comprises editing entries in the data structure corresponding to partially consumed memory segments and adding new entries to the data structure when necessary.

27. The method of claim 26, wherein editing partially consumed memory segments in the data structure comprises adjusting a start address or end address to match remaining contiguous, available memory space.

28. The method of claim 26, wherein adding a new entry to the data structure is performed when partial consumption of one memory segment results in two separated available memory segments.

29. The method of claim 26, wherein editing partially consumed memory segments in the data structure further comprises updating a bias of said partially consumed memory segments.

30. A method of allocating memory, said method comprising:
   creating a data structure containing a list of all available memory segments within said memory;
   prioritizing resource requests for use of said memory;
   matching said resource requests to available memory segments from said list and updating said list of all available memory segments;
   wherein said updating the list of all available memory segments further comprises editing entries in the data structure corresponding to partially consumed memory segments and adding new entries to the data structure when necessary;
   wherein editing partially consumed memory segments in the data structure further comprises updating a bias of said partially consumed memory segments; and
   wherein updating a bias of said partially consumed memory segment comprises maintaining an assigned bias unchanged if a size of a consumed space is an integer multiple of a corresponding alignment requirement.

31. A method of allocating memory, said method comprising:
   creating a data structure containing a list of all available memory segments within said memory;
   prioritizing resource requests for use of said memory;
   matching said resource requests to available memory segments from said list and updating said list of all available memory segments;
   wherein said updating the list of all available memory segments further comprises editing entries in the data structure corresponding to partially consumed memory segments and adding new entries to the data structure when necessary;
   wherein editing partially consumed memory segments in the data structure further comprises updating a bias of said partially consumed memory segments; and
   wherein updating a bias of said partially consumed memory segment further comprises assigning a start bias if a boundary of a contiguous memory segment adjacent the consumed memory segment is at an end of a contiguous memory segment, and a size of the consumed memory segment is not an integer multiple of a corresponding alignment requirement.

32. A method of allocating memory, said method comprising:
   creating a data structure containing a list of all available memory segments within said memory;
   prioritizing resource requests for use of said memory;

matching said resource requests to available memory segments from said list and updating said list of all available memory segments;
wherein said updating the list of all available memory segments further comprises editing entries in the data structure corresponding to partially consumed memory segments and adding new entries to the data structure when necessary;
wherein editing partially consumed memory segments in the data structure further comprises updating a bias of said partially consumed memory segments; and
wherein updating a bias of said partially consumed memory segment further comprises assigning an end bias if a boundary of a contiguous memory segment adjacent to the consumed memory segment is at a beginning of a contiguous memory segment, and a size of the consumed memory segment is not an integer multiple of a corresponding alignment requirement.

33. A method of allocating memory, said method comprising:
creating a data structure containing a list of all available memory segments within said memory;
prioritizing resource requests for use of said memory;
matching said resource requests to available memory segments from said list and updating said list of all available memory segments;
wherein said updating the list of all available memory segments further comprises editing entries in the data structure corresponding to partially consumed memory segments and adding new entries to the data structure when necessary;
wherein editing partially consumed memory segments in the data structure further comprises updating a bias of said partially consumed memory segments; and
wherein updating a bias of said partially consumed memory segment further comprises decomposing a remaining memory segment or segments into contiguous maximal naturally-aligned power-of-2 size ranges and assigning a corresponding bias if a size of a consumed memory segment is not an integer multiple of a corresponding alignment requirement.

34. The method of claim 33, wherein assigning the corresponding bias comprises assigning a start bias if a contiguous maximal naturally-aligned power-of-2 size ranges of a remaining memory segment are equal or monotonically decreasing.

35. The method of claim 33, wherein assigning the corresponding bias further comprises assigning an end bias if a contiguous maximal naturally-aligned power-of-2 size ranges of a remaining memory segment are monotonically increasing.

36. The method of claim 33, wherein assigning the corresponding bias further comprises assigning a neutral bias if a contiguous maximal naturally-aligned power-of-2 size ranges of a remaining memory segment are neither monotonically increasing nor monotonically decreasing nor equal.

37. A program, stored on a medium for storing computer-readable instructions, for allocating memory, said program, when executed, causing a host device to:
create a data structure containing a list of all available memory segments; and
assign a bias to each of said available memory segments, said bias specifying how said available memory segment is to be allocated in response to a resource request wherein the resource request is for a new entry in said memory unit that will be fragmented with at least two fragments of said new entry in said memory unit at being at different locations in said memory unit, said bias for an available memory segment comprising an indication of whether a corresponding available memory segment should be used a beginning fragment of a new entry in the memory unit (start bias), an end fragment of a new entry in the memory unit (end bias), or at any position within a new entry in the memory unit (neutral bias).

38. The program of claim 37, wherein said program, when executed, further causes said host device to:
sort resource requests;
match said resource requests to available memory segments; and
update said list of all available memory segments.

39. The program of claim 37, wherein said program, when executed, further causes said host device to store a starting and ending address of all available memory segments in said data structure.

40. The program of claim 37, wherein said program, when executed, further causes said host device to assign a start, end, or neutral bias to each available memory segment and store said bias in said data structure.

41. The program of claim 37, wherein said program, when executed, further causes said host device to decompose each available memory segment, dividing said memory segment into contiguous maximal naturally-aligned power-of-2 size ranges in order to assign said bias.

42. The program of claim 37, wherein said program, when executed, further causes said host device to prioritize said resource requests in accordance with a size requirement of each request.

43. The program of claim 37, wherein said program, when executed, further causes said host device to prioritize said resource requests in accordance with an alignment requirement of each request.

44. The program of claim 37, wherein said program, when executed, further causes said host device to take a first resource request in a sorted resource request list and consume a first memory segment found matching said first resource request.

45. The program of claim 44, wherein said program, when executed, further causes said host device to consume a memory segment depending on a bias of that memory segment.

46. The program of claim 37, wherein said program, when executed, further causes said host device to update the list of all available memory segments by erasing an entry from the data structure if an entire corresponding memory segment is consumed.

47. The program of claim 37, wherein said program, when executed, further causes said host device to edit entries in the data structure corresponding to partially consumed memory segments.

48. The program of claim 37, said program, when executed, further causes said host device to update a bias in said data structure of partially consumed memory segments.

49. The program of claim 37, wherein said basis dictates where in a new memory entry the corresponding available memory segment is to be located.

50. A system for allocating memory in a memory unit, said system comprising:
means for creating a data structure containing a list of all available memory segments; and
means for assigning a bias to each available memory segment, said bias indicating how to allocate that available memory segment in response to a resource request wherein the resource request is for a new entry in said memory unit that will be fragmented with at least two fragments of said new entry in said memory unit at being at different locations in said memory unit, said bias for an available memory segment comprising an indication of where within a new entry to be made in the memory unit a corresponding available memory segment should be used including for a beginning fragment of a new entry in the memory unit (start bias), for an end fragment of a new entry in the memory unit (end bias), or at any position within a new entry in the memory unit (neutral bias).

51. The system of claim 50, further comprising:

means for receiving a resource request from a PCI card or bridge;

means for allocating an available memory segment in response to said resource request and in accordance with the bias of an allocated memory segment; and means for updating said list of all available memory segments.

52. The system of claim 50, further comprising means for prioritizing the resource requests of the PCI cards and bridges.

53. The system of claim 50, wherein said basis dictates where in a new memory entry the corresponding available memory segment is to be located.

* * * * *

UNITED STATES PATENT AND TRADEMARK OFFICE
CERTIFICATE OF CORRECTION

PATENT NO.        : 8,060,680 B2                                Page 1 of 1
APPLICATION NO.   : 10/245229
DATED             : November 15, 2011
INVENTOR(S)       : Terry Ping-Chung Lee et al.

It is certified that error appears in the above-identified patent and that said Letters Patent is hereby corrected as shown below:

In column 9, line 45, in Claim 21, delete "claim 10," and insert -- claim 20, --, therefor.

In column 10, line 25, in Claim 30, delete "list and" and insert -- list; and --, therefor.

In column 10, line 46, in Claim 31, delete "list and" and insert -- list; and --, therefor.

In column 11, line 2, in Claim 32, delete "list and" and insert -- list; and --, therefor.

In column 11, line 25, in Claim 33, delete "list and" and insert -- list; and --, therefor.

Signed and Sealed this
Twenty-second Day of January, 2013

David J. Kappos
*Director of the United States Patent and Trademark Office*